_United States Patent_ [19]

Gruner

[11] 3,902,366

[45] Sept. 2, 1975

[54] MAGNETIC FLOWMETER SYSTEM

[75] Inventor: Heinz Walter Gruner, Rochester, N.Y.

[73] Assignee: Sybron Corporation, Rochester, N.Y.

[22] Filed: May 17, 1972

[21] Appl. No.: 254,000

[52] U.S. Cl. ......................................... 73/194 EM
[51] Int. Cl.² ........................................... G01F 1/58
[58] Field of Search ............... 73/194 EM; 328/166

[56] References Cited
UNITED STATES PATENTS

| | | | |
|---|---|---|---|
| 3,339,410 | 9/1967 | Steru | 73/194 EM |
| 3,603,146 | 9/1971 | Bennett et al. | 73/194 EM |
| 3,715,918 | 2/1973 | Bailey | 73/194 EM |

FOREIGN PATENTS OR APPLICATIONS

| 838,279 | 6/1960 | United Kingdom | 73/194 EM |
|---|---|---|---|

*Primary Examiner*—Charles A. Ruehl
*Attorney, Agent, or Firm*—Theodore B. Roessel; Joseph C. MacKenzie

[57] ABSTRACT

A magnetic flowmeter system having a high impedance double ended AC preamplifier stage for amplifying voltages induced in a fluid flowing in and transverse to the field of an AC energized electromagnet. The preamplifier output voltages are amplified in a single-ended AC amplifier. The output voltage of the AC amplifier is demodulated by a phase sensitive detector. The DC output voltage is divided by a DC voltage derived from the AC source of energization for the electromagnet, so a net output voltage results which is free of common mode and quadrature voltages and independent of field fluctuations, but is obtained without feedback to the input of the system.

8 Claims, 4 Drawing Figures

PATENTED SEP 2 1975    3,902,366

3,902,366

MAGNETIC FLOWMETER SYSTEM

FIELD OF THE INVENTION

The invention is in the field of so-called magnetic flowmeters wherein volumetric rate of flow is measured on the basis of the voltages induced by fluid flow through and transverse to a magnetic field. A common problem here is that the induced voltages due to flow are usually a minor component of the total voltage actually sensed in the fluid.

DESCRIPTION OF THE PRIOR ART

The solution to the aforesaid problem has generally involved using amplifier techniques to deal with the total voltage sensed in the fluid in order to get rid of common mode and quadrature components and the influence of fluctuations in the magnetic field. However, amplifier techniques in the past have generally been applied to create what is for the most part one rather elaborate feedback (phase and frequency selective) amplifier, wherein the usual advantages of the feedback are traded-off with unfavorable signal to noise ratio in some degree.

SUMMARY

In the present invention, operational amplifier techniques are used. However, the overall system is entirely open-loop, to avoid the effects of phase and frequency selective feedback on the original level of the flow-induced voltages. Common mode voltages are reduced by differential amplification, quadrature voltages are eliminated by phase sensitive demodulation, and the influence of the magnetic field is eliminated by dividing it out, in effect, at a point in the system wherein the signal is a common-mode-free and quadrature-free voltage proportional to the product of flow rate and field fluctuation. In addition to common mode, quadrature and field fluctuation effects, the voltages initially picked up are kept free of all other influences by appropriate packaging, so to speak, of low level parts of the system.

DESCRIPTION OF THE PREFERRED EMBODIMENT

Figure 1:
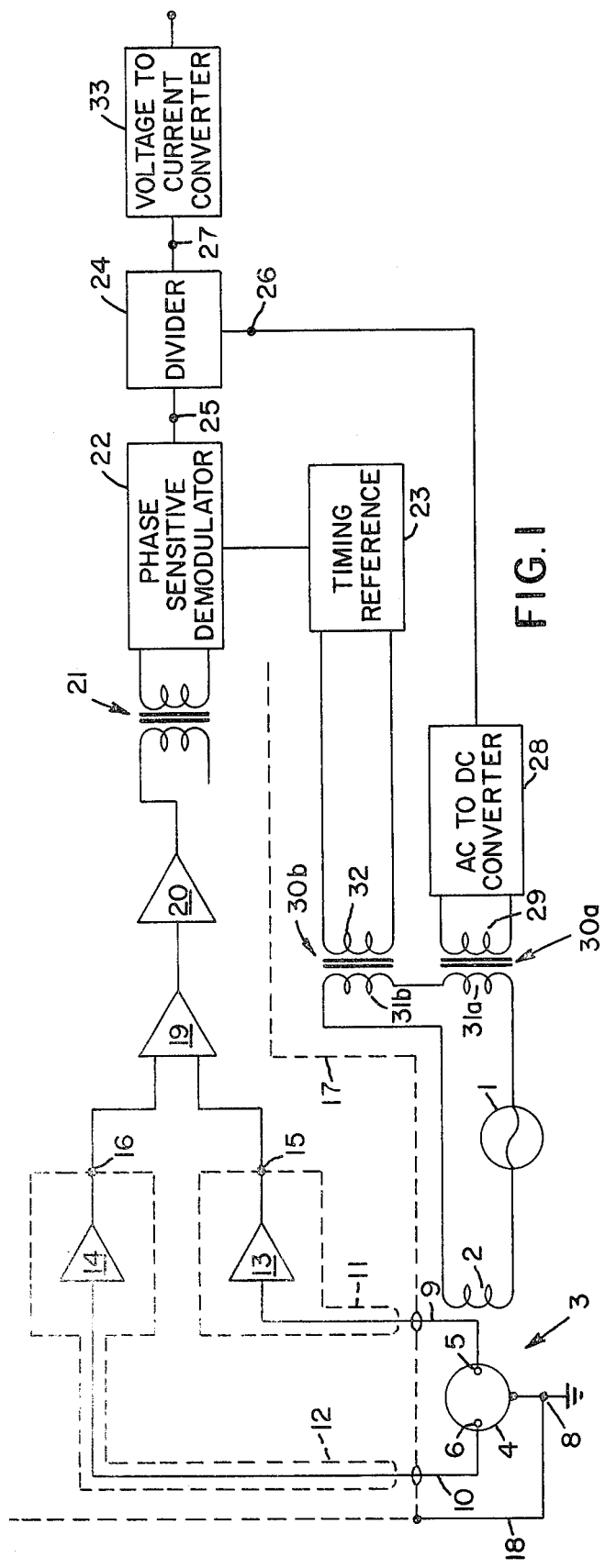
FIG. 1 is a diagram of a magnetic flowmeter system according to the invention.

In FIG. 1, an AC source 1 energizes the magnetic field generating structure, represented by the coil 2, of a flow transducer 3 having a short section 4 of conduit having electrodes 5 and 6 mounted inside the section 4. The section 4 is either non-conductive, or is conductive and has a non-conductive lining therein, and, in the latter case, the electrodes 5 and 6 are insulated from the section 4, but in any event there will be in effect a connection of the fluid in the pipe to ground, as, for example, via terminal 8.

Conductive leads 9 and 10, enveloped in conductive shields 11 and 12, connect electrodes 5 and 6 to the inputs of amplifiers 13 and 14. Shields 11 and 12 extend around the amplifiers and connect to the outputs of the amplifiers at terminals 15 and 16 respectively.

An outer shield 17, having a lead 18 conductively connecting it to ground terminal 8 encloses leads 9 and 10, shields 11 and 12, and at least amplifiers 13 and 14, and 19 and 20, as indicated by the open-ended depiction of the shield 17. In practice, shield 17 commonly includes, electrically speaking, a metal casing enveloping section 4, and field structure 2. If the amplifiers 13 and 14, etc., are also enclosed in such casing, then this last is the entire shield. While for convenience shields 11, 12 and 17 have been drawn so as to leave some of the leads 9 and 10 outside them, in any case, said shields will envelop them entirely. Naturally, shield 17 has only capacitive and inductive coupling to the amplifiers and their input and output leads. Likewise, shields 11 and 12 have, at most, only capacitive and inductive coupling to one another, and to amplifiers 13 and 14, leads 9 and 10, section 4, etc.

Amplifiers 13 and 14 provide impedance conversion and amplification. Preferably they are field effect transistor (FET) circuits with several hundreds megohms input impedance, and many orders lesser output impedance, zero ohms being the ideal, and amplify the voltages on leads 9 and 10 enough to bring them to a level high enough that the effects of stray fields and other electrical vagaries of the environment will not be significant. On the input end, where the voltage levels are quite low, the shields 11, 12 and 17 ward off such effects, partly by reason of grounding 17, and partly by the connections of shields 11 and 12 to the amplifier outputs, which, as is well known, minimizes capacitive coupling of unwanted signal to the amplifiers through the shielding itself.

The voltages at terminals 15 and 16 represent the voltages with respect to ground, of electrodes 5 and 6, respectively. All these voltages are low level AC voltages, only one component of which is induced by flow through the alternating magnetic field produced by structure 2. (It is to be supposed that the flow is that of a liquid or very low conductivity, perpendicular to the paper and within the outline of section 4; and that the direction of the field is along the horizontal of the Figure and through section 4). The other components of the voltages at terminals 15 and 16 are common mode and quadrature voltages, and all components reflect fluctuations in the voltage of source 1. In addition, at low flows, the flow component may be small compared to the total of the other components.

In order to get rid of the common mode components, the voltages at terminals 15 and 16 are applied to the input terminals of a conventional differential amplifier 19, the output voltage of which is connected to a single ended amplifier 20, in order to further raise the signal level. Amplifiers 19 and 20 are AC coupled and are preferably highly stabilized by local feedback in each thereof.

It will be observed that thus far the amplifying system as a whole is open loop, and, in fact, as will be seen later, it is open loop all the way through, unless for local feedback such as in amplifiers 19 and 20. The reason for this is that when the ratio of flow signal to all other sorts of signal in the low end of the system is sufficiently low, say 1 to 1 or less, feedback to low levels is simply a waste of flow information as any practical sort of overall, phase and frequency selective feedback arrangement would suppress flow information signal levels so much, that the said ratio would decrease to 1 to 10,000 or less, depending on the feedback ratio.

A transformer 21 couples the output voltage of amplifier 20 to a phase sensitive demodulator 22 which, with the help of timing reference 23, produces a DC output voltage which it applies to a divider 24. The function of the demodulator is to reject the out of phase components in the output voltage of amplifier 20. The timing reference is preferably a precision square wave voltage properly phased with source 1, so that the aforesaid DC output voltage contains only such components of the original signal as were in phase with the flow component of the original signal. Accordingly, what is left of the original information contained in the voltages on leads 9 and 10 is a flow rate component multiplied by a factor reflecting fluctuations in current through the windings of structure 2.

The purpose of divider 24 is to eliminate the factor due to source fluctuations, so it will be any suitable computing circuit or device such that if to its terminal 25 is applied a DC voltage equal to XY, and to its terminal 26 a voltage proportional to Y, it will produce at its output terminal 27 a signal which is a function of X only, for instance, a DC voltage equal to X.

As will be seen from FIG. 1, an AC to DC converter 28 is connected to the terminal 26, and the former in turn is connected to a winding 29 of transformer 30a whose primary winding 31a is connected in series with the coil 2 and source 1. (A transformer 30b also provides a winding 32 providing the phase information to timing reference 23, which demodulator 22 needs in order to reject out of phase components from the information in the output voltage of amplifier 20).

Converter 28 converts the AC voltage on winding 29 to a DC voltage proportional to the amplitude of the said AC voltage, and it is thus DC voltage that is applied to terminal 26. Accordingly, it will be seen that the terminal 25 has a voltage thereon representing the product of flow rate and source current fluctuation, and terminal 26 has a voltage thereon representing the said source current fluctuation only. Accordingly, the output voltage on terminal 27 represents flow rate only.

The uses of the voltage on terminal 27 are obvious. For example, it may be converted to a DC signal by a voltage to current converter, for transmitting to a controller, recorder, integrator or the like, and in any event what is done with the voltage at this point forms no part of the invention as long as it is not used as feedback to the input to the system, of such nature as would result in suppressing flow rate components at low levels of the original signal.

It will be seen that the open loop character of the system makes for great simplicity and straightforwardness, mainly due to the absence of system feedback features, which would pose difficult design problems, the solutions of which would be chronic sources of problems themselves, during use of the system.

Figure 4:
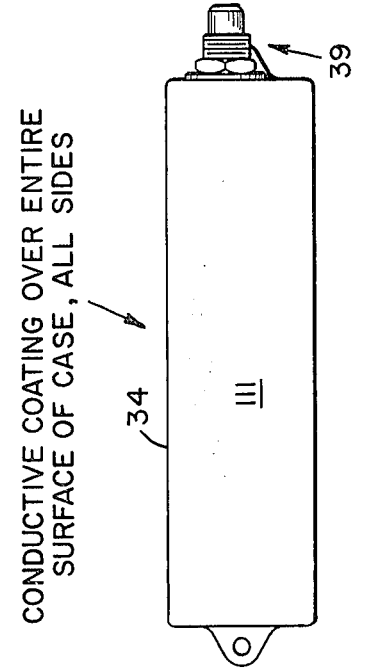
Figure 3:
FIGS. 2 and 3 are illustrations, partly in section, of the structural arrangement of low level portions of a magnetic flowmeter system according to the invention.

The system according to the invention has been found completely tolerant of electrode fouling to such extent as would make a conventional system inoperative. One of the crucial elements of an open loop system according to the present invention is extraction of the original signal from the electrodes 5 and 6. According to the present invention, this crucial element is provided for by the structural arrangement of the low level end of the system shown in FIGS. 2, 3 and 4.

Figure 2:
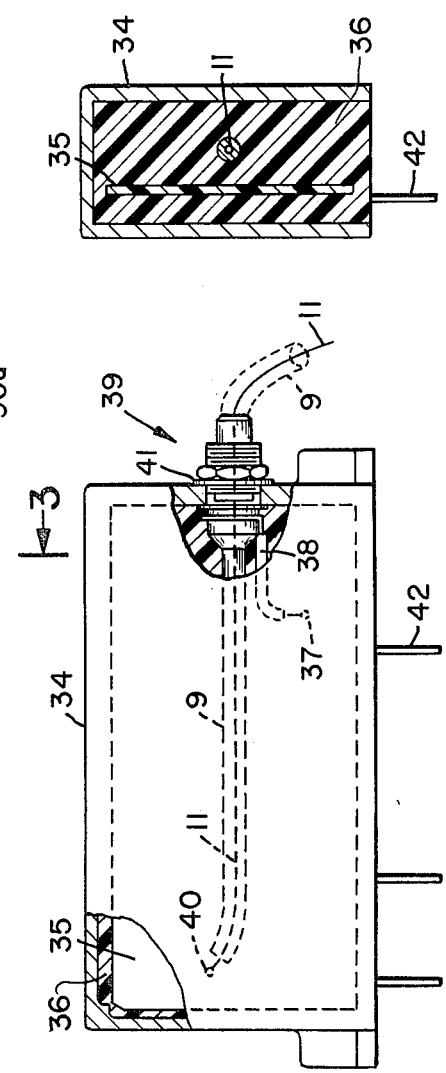

In FIG. 2, a more or less rectangularly parallelepipedal polypropylene case 34 houses a miniature circuit board 35, upon which is located one only of the amplifiers 13 and 14, say 13. As will be seen from FIG. 3, which is an end elevation of case 34, sectioned on plane 3—3 of FIG. 2, the circuit board is solidly potted within the case, by potting material 36. Connection to the output of the amplifier 13 is made at an eyelet of the board 35, from whence a wire 38 connects to the external (and conventional) mounting hardware 39 of the connector which forms electrically part of the outer conductor of the connector. As will be seen from the drawing, shield 11 is electrically continuous with said outer conductor and extends all the way to an eyelet 40 which in effect is the input terminal of amplifier 13. (It is to be supposed, of course, that in FIG. 2 we are looking into the interior of case 39, in the absence of potting material, and at the underside of the circuit board, at the broken upper left corner of the case). Lead 9 is continuous with the center conductor of the connector, and so goes into the eyelet 40. Shield 11 also extends around the case 34 in the form of a conductive coating 111 sprayed on or otherwise incorporated in the outer surface of case 34 (including its cover). The coating extends under the mounting hardware (e.g., under metal washer 41) so that when the hardware is tightened up a good DC contact exists between the coating and the connector hardware. The rest of lead 9 and shield 11 extend from the connector to the electrodes 5 (Not shown in FIG. 2).

The amplifier 14 is packaged the same way, and it and amplifier 13 are of course also enveloped in the outer shield 17, as, for example, within metal casing structure incorporating the section 4, its field structure and electrodes. Power supply and other connections may be provided for by leads coming out of the case 34 through its bottom, for example, the connection to amplifier 19 may be made through bottom lead 42.

The desired structural arrangement has been found to insure that the output voltages remain substantially free of all information except that which the rest of the system is designed to deal with. At the same time, the structural arrangement is economical, desirable, and substantially fool proof, since once the module is complete, it is impossible to tamper with its contents short of damaging them beyond repair.

Having described my invention in accordance with 35 USC 112, I claim:

1. A magnetic flowmeter system having a flow transducer including AC-energized magnetic field producing means and electrodes for picking up voltages induced with respect to ground in flow of a fluid through said magnetic field and transverse thereto, said voltages including components proportional to said flow and to said magnetic field, and as well, common mode and quadrature components;

said system also having open loop, stabilized amplifying means connected to said electrodes for amplifying said voltages such as to produce a first voltage. the amplitude of which reflects substantially only said components proportional to said flow and said field, and quadrature components;

said system also having detecting means connected to said amplifying means for receiving said first voltage and producing a second voltage the amplitude of which reflects substantially only said components proportional to said flow and to said field;

said system also having reference means for producing a third voltage proportional to said field;

said system also having computing means for receiving said second and third voltages and combining same for producing an output signal the amplitude of which reflects only said components proportional to said flow.

2. The system of claim 1 wherein said reference means is AC-energized, and it and said magnetic field producing means are arranged to be energized by a common AC source.

3. The system of claim 1, wherein said detecting means is a phase sensitive demodulator producing said second voltage in the form of a DC voltage proportional to XY, wherein X represents said components proportional to said flow and Y represents said components proportional to said field;

said reference means being AC-energized like said magnetic field producing means for producing said third voltage in the form of a DC voltage proportional to Y;

and said computing means is a divider for receiving said DC voltages and dividing the former said DC voltage by the latter said DC voltage.

4. The system of claim 3 wherein said reference means and said magnetic field producing means are arranged to be energized by a common AC source, and said demodulator is also arranged to be effectively connected to said AC source for timing reference.

5. The system of claim 4 wherein said amplifying means produces said first voltage in the form of an AC voltage, and there is transformer means interconnecting said detecting means and said amplifying means for applying the last said AC voltage to said detecting means.

6. The system of claim 1, said system also including a case, said case enveloping and having potted therein an amplifier element of said amplifying means, said element having a conductive input lead coming out of said case for connection to one of said electrodes, said lead having a conductive shield enveloping it but DC isolated therefrom, said shield also having an extension enveloping said amplifier element and DC connected to the output of said amplifier element;

said extension being supported by said casing and substantially coextensive therewith;

said system also having a second shield, said second shield enveloping the first said shield and the said extension, and being DC isolated therefrom and arranged to be connected to ground.

7. The system of claim 6, wherein said extension is a conductive coating on the surface of said case, and said case is made of insulating material.

8. The system of claim 7, wherein said case has a coaxial connector for leading said first said shield and said lead out of said case, the outer part of said connector forming part of said first said shield and the center part of said connector forming part of said lead;

said outer part contacting a surface portion of said case and being clamped to said case at said portion, said portion being a portion of said case having said coating thereon.

* * * * *